(12) United States Patent
Scrivner et al.

(10) Patent No.: US 11,443,302 B2
(45) Date of Patent: *Sep. 13, 2022

(54) SYNCING BLOCKCHAIN NODES WITH SNAPSHOTS

(71) Applicant: Coinbase, Inc., San Francisco, CA (US)

(72) Inventors: Eric Scrivner, San Francisco, CA (US); Matthew Werner, San Francisco, CA (US); Robert John Kearney, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/064,848

(22) Filed: Oct. 7, 2020

(65) Prior Publication Data

US 2021/0027282 A1 Jan. 28, 2021

Related U.S. Application Data

(63) Continuation of application No. 16/773,149, filed on Jan. 27, 2020, now Pat. No. 10,839,377.

(60) Provisional application No. 62/797,026, filed on Jan. 25, 2019, provisional application No. 62/822,574, filed on Mar. 22, 2019.

(51) Int. Cl.
| | |
|---|---|
| *G06F 7/02* | (2006.01) |
| *G06F 16/00* | (2019.01) |
| *G06Q 20/36* | (2012.01) |
| *H04L 9/06* | (2006.01) |
| *G06F 16/23* | (2019.01) |

(52) U.S. Cl.
CPC ..... *G06Q 20/3672* (2013.01); *G06F 16/2365* (2019.01); *G06F 16/2379* (2019.01); *G06Q 20/3678* (2013.01); *H04L 9/0637* (2013.01)

(58) Field of Classification Search
CPC ... H04L 29/08; H04L 9/0637; G06Q 20/3672; G06Q 20/3678; G06F 16/00; G06F 16/2379; G06F 16/22; G06F 16/2365
See application file for complete search history.

(56) References Cited

U.S. PATENT DOCUMENTS

| | | |
|---|---|---|
| 10,505,623 B2 | 12/2019 | Metzger et al. |
| 2017/0206140 A1 | 7/2017 | Smith et al. |
| 2018/0089041 A1 | 3/2018 | Smith et al. |
| 2019/0013934 A1 | 1/2019 | Mercuri et al. |
| 2019/0288771 A1 | 9/2019 | Metzger et al. |
| 2020/0004855 A1 | 1/2020 | Chepak et al. |
| 2020/0067697 A1 | 2/2020 | Puddu et al. |
| 2020/0134139 A1 | 4/2020 | Vaish |

(Continued)

FOREIGN PATENT DOCUMENTS

| | | |
|---|---|---|
| WO | 2017066715 A1 | 4/2017 |
| WO | 2019067989 A1 | 4/2019 |

OTHER PUBLICATIONS

"Bison Trails is the easiest way to run infrastructure multiple blockchains", http://web.archive.org/web/20190914011319/https://bisontrails.co/, Sep. 14, 2019, pp. 1-9.

(Continued)

*Primary Examiner* — Bruce M Moser
(74) *Attorney, Agent, or Firm* — Perkins Coie LLP

(57) ABSTRACT

System and method for synchronizing blockchain nodes by using snapshots.

20 Claims, 9 Drawing Sheets

(56) References Cited

U.S. PATENT DOCUMENTS

2020/0143372 A1   5/2020  Liu et al.
2021/0191702 A1*  6/2021  Wang ...................... G06F 21/51

OTHER PUBLICATIONS

"Coinbase Details 'Snapchain' Block Syncing Solution,", https://vmvirtualmachine.com/coinbase-details-snapchain-block-syncing-solution/, Jan. 27, 2019. (Year: 2019).
"How to run Ethereum Mainnet node on AWS", Rumble Fish Software Development—Medium, May 25, 2018, pp. 1-13.
Lardinois, Frederic, "Microsoft wants to make blockchain networks enterprise-ready with its new Coco Framework", www.techcrunch.com, Aug. 10, 2017, pp. 1-11.
Shieber, Jonathan, "AWS opens up its managed blockchain as a service to everybody", TechCrunch, Apr. 30, 2019, pp. 1-10.
International Search Report and Written Opinion for application No. PCT/US20/51179 dated Feb. 8, 2021.

* cited by examiner

200

GENERATE A NODE IN A SNAPCHAIN CONFIGURATION S210

CREATE NEW PARENT NODE S211

SPAWN FIRST CHILD NODE FROM PARENT NODE S212

SYNCH FIRST CHILD NODE S213

PERFORM HEALTH CHECKS S214

RECEIVE SIGNAL FROM CHILD NODE THAT SYNC IS COMPLETE S215

GENERATE A SNAPSHOT S220

SEND TERMINATING SIGNAL FROM PARENT NODE TO CHILD NODE S221

RECEIVE SIGNAL FROM CHILD NODE THAT TERMINATION IS COMPLETE S222

SEND SIGNAL TO GENERATE SNAPSHOT S223

SYNCH USING A SNAPSHOT S230

SPAWN SECOND CHILD NODE FROM PARENT NODE S231

SYNCH SECOND CHILD NODE USING GENERATED SNAPSHOT S232

*FIGURE 2*

SYNCING BLOCKCHAIN NODES WITH SNAPSHOTS

CROSS-REFERENCE TO RELATED APPLICATIONS

This application is a continuation of U.S. patent application Ser. No. 16/773,149, filed 27 Jan. 2020, which claims the benefit of US Provisional Application No. 62/797,026, filed 25 Jan. 2019 and US Provisional Application No. 62/822,574, filed 22 Mar. 2019, which are each incorporated herein in its entirety by this reference.

TECHNICAL FIELD

This invention relates generally to the computer networking field, and more specifically to a new and useful system and method for syncing blockchain nodes with snapshots in the computer networking field.

BACKGROUND

Many companies are building blockchain infrastructures within their networks and systems in order to take advantage of their many capabilities. Blockchains are linked lists of blocks, where each block contains modifications to the global state. Blockchains are decentralized, peer-to-peer systems, with no central authorities propagating changes to the network. Instead, blockchain nodes validate, detect, and relay state updates. For example, whenever someone wants to send funds into a particular blockchain platform, they can log into their app, where a deposit address is displayed. They may use a wallet to control and send their funds. The blockchain platform can detect they actually did send funds to an address controlled by the platform by querying these nodes. The platform pings these nodes to determine whether the transaction occurred. Thus, blockchain nodes are critical to the business operations of any company invested in building a blockchain architecture. Without the nodes, the platform would be unable to interact with the blockchain network in any substantive way. Thus, companies typically wish to deploy and redeploy nodes within the blockchain infrastructure as quickly and efficiently as possible.

Blockchains contain a large amount of data, which is known as the "chain state". Often, services incorporating blockchains need to start up nodes, and need to have those nodes contain the entire chain state when they start up. Starting up and syncing a node to the chain state from scratch would typically take several days, weeks, or months to complete, depending on which protocol is implementing the blockchain. This is undesirable especially for larger scale services and operations that rely on blockchain, and those for which new nodes being created is a time-critical matter.

Furthermore, when upgrading a node to a newer version, if something goes wrong and the blockchain state was used to upgrade, rolling back becomes very challenging. If snapshots exist for the chain state so that the state can be rolled back to the snapshot, if they're not versioned, then there's no way to ensure safe upgrades and rollbacks.

A full sync from the network on every deploy is not a viable solution. First, the pace of development in the blockchain and cryptocurrency ecosystems are rapid. Second, the safety and reliability constraints of blockchain infrastructures demand safe, fast, and efficient syncing of nodes on short notice. Third, node upgrades are often time-sensitive and require fast upgrades and rollbacks. Fourth, the platform may require access to abandoned chain forks, which are oftentimes overwritten by the blockchain network.

Thus, there is a need in the computer networking field to create a new and useful system and method for syncing blockchain nodes. The source of the problem, as discovered by the inventors, is a lack of methods for syncing nodes very quickly while still ensure accuracy and regular updates. This invention provides such a new and useful system and method.

BRIEF DESCRIPTION OF THE FIGURES

FIG. 2 is a flowchart representation of a method, in accordance with embodiments.

DESCRIPTION OF THE PREFERRED EMBODIMENTS

Figure 1:
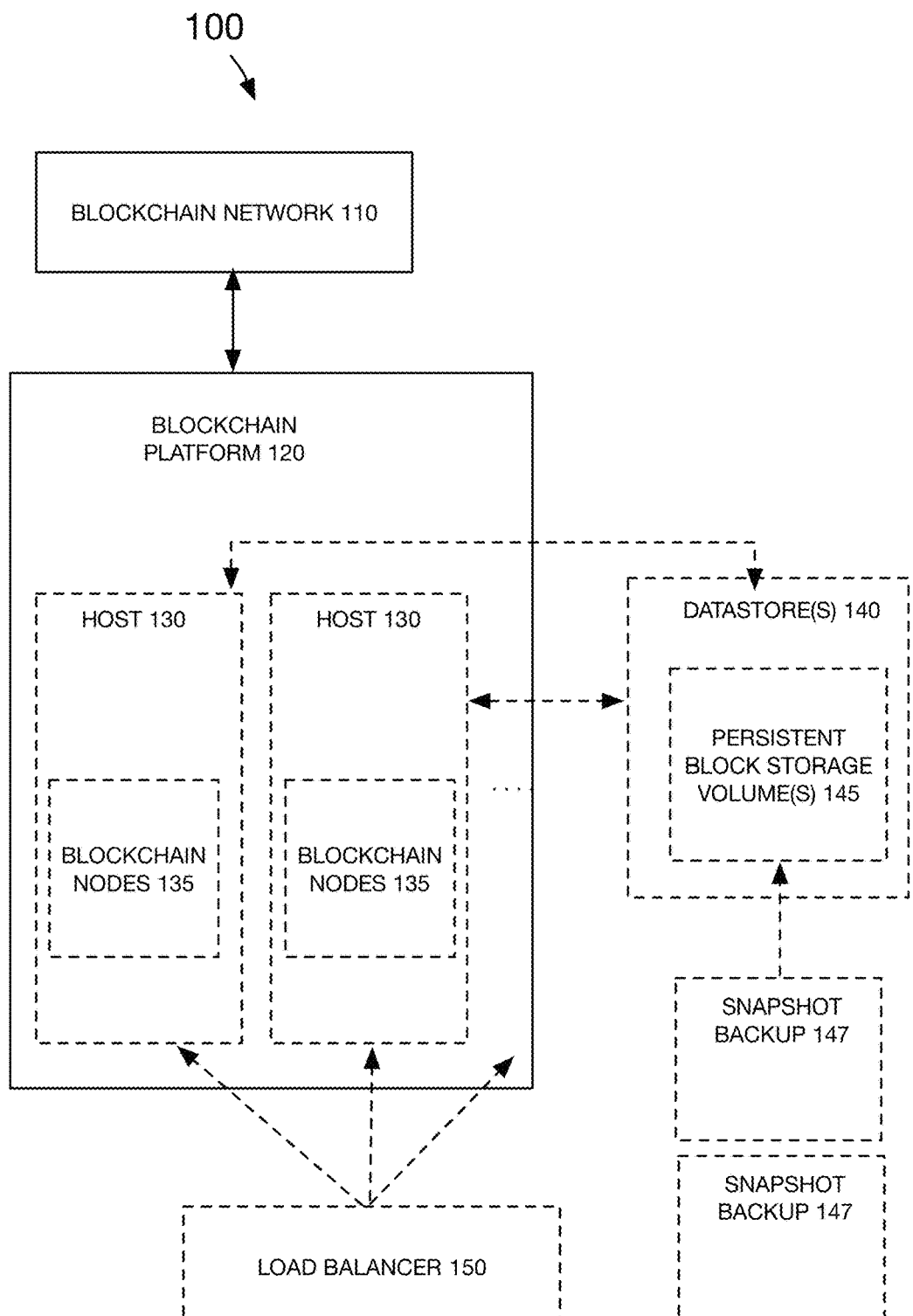
FIG. 1 is a schematic representation of a system, in accordance with embodiments.

The following description of the preferred embodiments of the invention is not intended to limit the invention to these preferred embodiments, but rather to enable any person skilled in the art to make and use this invention.

1. Overview.

In some embodiments, the method includes at least one of: generating a node in a snapchain configuration, generating a snapshot, and synching using a snapshot. In some embodiments, generating a snapshot includes using the node in the snapchain configuration to generate the snapshot. In some embodiments, the snapshot (generated by using the node in the snapchain configuration) is used to perform the synching. In some embodiments, synching using the snapshot includes synching a new node in a snapshot configuration using a snapshot. In some embodiments, synching using the snapshot includes synching a new node in a long-lived configuration using a snapshot.

In some embodiments, generating a node in a snapchain configuration includes at least one of: creating a new parent node in a blockchain associated with a cryptocurrency protocol; spawning a first child node from the parent node; and syncing the first child node.

In some embodiments, generating a snapshot includes at least one of: sending a termination from the parent node to the child node; and generating a snapshot of the datastore.

In some embodiments, synching using a snapshot includes at least one of: spawning a second child node from the parent node; and syncing the second child node using the generated snapshot. In some embodiments, the second child node is a node in a snapchain configuration. In some embodiments, the second child node is a node in a long-lived configuration. In some embodiments, the method is a method for node syncing.

In some embodiments, the method functions to facilitate "snapshotting" of a chain state in order to sync new nodes. "Snapshotting" herein means backing up data on a datastore by taking point-in-time "snapshots", or incremental backups. This is in contrast to fully syncing, which backs up all data on the datastore from the beginning of all time. "Incremental backups" means that only the blocks on the device that have changes after the most recent snapshot are saved, e.g., only the delta of the blocks on the device and the most recent snapshot are synced. This minimizes the time required to create the snapshot and saves on storage costs by not duplicating data. In some embodiments, when deleting a snapshot, only the data unique to that snapshot is removed. Each snapshot contains all of the information needed to restore data from the moment when the snapshot is taken to a new datastore volume.

In one specific example, a new node (e.g., a new, unsynced virtual compute instance) is started and it syncs completely, which can take several days or a month. Once it is fully synced, the system captures a snapshot in a datastore, then spawns a new child instance of that node that will load that snapshot. In comparison to the full manual sync, this takes a few minutes. Once that snapshot is taken, it can be categorized and individually versioned, which allows for safe node software upgrades and fallbacks to previous versions.

All or portions of the method can be performed at a predetermined frequency, performed upon occurrence of an execution event, or performed at any other suitable time.

2. Benefits.

This method can confer several benefits over conventional blockchain node syncing methods on blockchain platforms.

First, the method allows fast snapshotting and restoring of the chain state for syncing blockchain nodes. This minimizes the time-to-sync-from-network (TTSFN) whenever a new node comes online.

Second, the method implements snapshot versioning for blockchain nodes.

Third, the method implements safe fallback strategies for base snapshots.

Fourth, the method implements an operations pipeline for snapshots.

Fifth, the method is blockchain-agnostic, allowing the adding of new blockchain nodes quickly regardless of which blockchain protocol the blockchain node is implemented with.

3. System.

As shown in FIG. 1, the system 100 includes at least one of: a blockchain network 110, a blockchain platform 120, a load balancer 150, a datastore 140, a persistent block storage, and block storage volume(s) 145.

Blockchain network 110 is a network operated according to a blockchain protocol. In preferred embodiments, the blockchain network is a cryptographic currency network (CCN), wherein the blockchain is implemented with a cryptocurrency protocol, such as Bitcoin, Ethereum, or any other cryptocurrency protocol. In various embodiments, such cryptocurrency protocols are implemented via node software, and may include the Bitcoin cryptocurrency protocol as implemented by bitcoind, the Ethereum cryptocurrency protocol as implemented by Geth, or any cryptocurrency protocol implemented in one or more ways. The node software connects to the blockchain network, persists the chain state to a datastore, and other tasks. In some embodiments, the blockchain network (e.g., no) is a network that functions to enable buying, selling, and transferring of one or more digital cryptocurrencies. In some embodiments, the blockchain network 110 includes one or more smart contracts or other programs operating on top of the blockchain protocol.

Blockchain platform 120 functions as a remote server for building and maintaining a blockchain infrastructure. In various embodiments, the blockchain platform can be implemented on a remote server system, distributed computing systems, or local computing systems. The blockchain platform interacts with one or more blockchain networks (e.g., 110) and one or more datastores (e.g., 140). In some embodiments, the blockchain platform 120 can implement an arbitrary number of host instances (e.g., virtual server instances 130). In a preferred embodiment, the blockchain platform 120 functions to start new blockchain nodes (e.g., 135), sync blockchain nodes to the chain state of the blockchain, generate snapshots of the chain state from the datastore, implement child nodes spawned from parent nodes, and other aspects of building and maintaining blockchains and/or blockchain nodes.

Virtual servers 130 are one or more virtual server instances. In a preferred embodiment, the virtual servers 130 operate on a remote cloud-based network and provide scalable, resizable compute capacity in the cloud on demand. One example of such cloud-based compute capacity is Amazon Elastic Compute Cloud (EC2), a web service that provides resizable compute capacity in the cloud. The virtual server instances can be, e.g., EC2 instances or any other instance of a virtual machine.

Each virtual server 130 contains one or more blockchain nodes (e.g., 135), each of which are governed by a blockchain protocol. Blockchain nodes detect, validate, and relay state updates across the blockchain network 110, wherein the blockchain states are synched from peer nodes. The blockchain platform 120 uses the blockchain nodes 135 to receive information about the blockchain network, including verification of (and notification about) various aspects of the blockchain. In some implementations, synced blockchain node maintains a full copy of the blockchain's chain state on disk (e.g., the blockchain node is connected to a datastore volume that serves as the node's hard drive, which maintains a copy of the blockchain's chain state). In a preferred embodiment, a series of blockchain nodes within a single virtual server 130 may constitute a "snap node" for generating and restoring snapshots. In some embodiments, a snap node constitutes a parent blockchain node and one or more child blockchain nodes. In some embodiments, a snap node can be configured such that the parent blockchain node is in a snap node configuration to instruct child nodes, at least one child node is in a snapchain configuration to semi-regularly generate snapshots of the chain state, and at least one child node is in a long-lived configuration to restore a snapshot.

Load balancer 150 allows the blockchain platform 120 to scale the blockchain infrastructure to meet demand. The load balancer 150 distributes incoming traffic across multiple targets, such as nodes and datastores. In some embodiments, the load balancer 150 enables static internal protocol (IP) addresses to be assigned. In a preferred embodiment, the load balancer 150 can perform blue/green deploys of blockchain nodes, e.g., two identical production environments where only one environment is live at a time and wherein the blockchain environment switches between one environment and another seamlessly, which often reduces downtime and risk within a network environment.

In a preferred embodiment, the load balancer is a network load balancer (NLB) which replaces the conventional load balancer. The NLB creates a load balancer node in each of one or more Availability Zones, and handles Transmissions Control Protocol (TCP) connections load balancing between the Availability Zones. Load balancer nodes in each Availability Zone can be assigned a static IP address, thereby enabling static IP registration of blockchain nodes. In a preferred embodiment, a single blockchain node instance is placed behind each load balancer node, with one static IP per one node, and one node per Availability Zone. In alternative embodiments, the NLB can enable cross-zone load balancing, wherein each load balancer node distributes traffic across the registered targets in all enabled Availability Zones.

Datastore(s) 140 (datastore volume, data volume) provide data storage for the blockchain platform, and contain the chain state of one or more blockchains. In a preferred embodiment, a datastore 140 provides cloud-based data storage, specifically persistent block storage. In a preferred embodiment, block storage volumes are provided for use with the persistent block storage volumes, which are replicated within each Availability Zone of an NLB to protect from component failure. One example of persistent block storage volumes is Amazon Elastic Block Store (EBS), which provides persistent block storage volumes for use with EC2 instances in the cloud.

In some implementations, the datastore 140 includes an Application Programming Interface (API) system that provides an API for creating snapshots, identifying snapshots (e.g., that have tag information matching specified attributes), and creating datastore volumes (e.g., based on snapshots). In some implementations, the datastore provides an API that processes Create_Snapshot( ) requests, Describe_Snapshot( ) requests, Create_Volume( ) requests, and Attach_Volume( ) requests.

In some variations, a node (e.g., a parent blockchain node in a snap node configuration, a node in a snapchain configuration, etc.) can provide a Create_Snapshot( ) request to the datastore to create a new snapshot for a datastore volume identified by the request. In some implementations, the Create_Snapshot( ) request identifies snapshot tag information to be stored in association with the generated snapshot. In some implementations, the datastore processes the Create_Snapshot( ) request by creating the snapshot for the identified datastore volume, storing the snapshot in association with the tag information, and providing the node (that issues the Create_Snapshot( ) request) with a snapshot identifier (ID) for the created snapshot. In some embodiments, the first snapshot created for a datastore volume by processing a Create_Snapshot( ) request is a full backup, whereas subsequent snapshots created for the same datastore (by processing a Create_Snapshot( ) request) are incremental backups.

In some variations, a node (e.g., a parent blockchain node in a snap node configuration, a node in a snapchain configuration, etc.) can provide a Describe_Snapshots( ) request to the datastore to receive a list of available snapshots. In some implementations, the Describe_Snapshots( ) request identifies selection parameters for selecting a snapshot based on tag information. In some implementations, the datastore processes the Describe_Snapshots( ) request by returning information identifying all available snapshots. In some implementations, the datastore processes the Describe_Snapshots( ) request by identifying snapshots that match the selection parameters identified by the Describe_Snapshots( ) request, and returning information identifying all matching snapshots.

In some variations, a node (e.g., a parent blockchain node in a snap node configuration, a node in a snapchain configuration, etc.) can provide a Create_Volume( ) request to create a new datastore volume (at the datastore 140) based on a snapshot identified by the request. In some implementations, the datastore processes the Create_Volume( ) request by creating a new datastore volume from the snapshot identified by the Create_Volume( ) request, and returning information identifying the created volume.

In some variations, a node (e.g., a parent blockchain node in a snap node configuration, a node in a snapchain configuration, etc.) can provide an Attach_Volume( ) request to attach a datastore volume identified by the request to a virtual server instance (e.g., 130) associated with the request. In some implementations, the datastore processes the Attach_Volume( ) request by attaching the identified datastore to the virtual server instance, such that a blockchain node (e.g., 135) can read chain-state from (and write chain-state to) the attached datastore volume.

4. Method.

FIG. 2 is a flowchart representation of a method 200, according to embodiments.

In some embodiments, the method includes at least one of: generating a node in a snapchain configuration S210; generating a snapshot S220; and synching using a snapshot S230. In some embodiments, generating a snapshot includes using the node in the snapchain configuration to generate the snapshot. In some embodiments, the snapshot generated by using the node in the snapchain configuration is used to perform the synching. In some embodiments, synching using the snapshot includes synching a new node in a snapshot configuration using a snapshot. In some embodiments, synching using the snapshot includes synching a new node in a long-lived configuration using a snapshot.

In some embodiments, generating a node in a snapchain configuration (S210) includes at least one of: creating a new parent node in a blockchain associated with a cryptocurrency protocol S211; spawning a first child node from the parent node S212; syncing the first child node S213; performing health checks S214; and receiving a signal form the child node that the synch is complete S215.

In some embodiments, generating snapshot (S220) includes at least one of: sending a termination from the parent node to the child node S221; receiving a signal from the child node that termination is complete S222; and generating a snapshot S223.

In some embodiments, synching using a snapshot (S230) includes at least one of: spawning a second child node from the parent node S231; and syncing the second child node using the generated snapshot S232. In some embodiments, the second child node is a node in a snapchain configuration. In some embodiments, the second child node is a node in a long-lived configuration. In some embodiments, the method is a method for node syncing.

In some embodiments, the method 200 includes using a parent node (e.g., 310 shown in FIG. 3) to create one or more snapchain-configuration nodes (e.g., 330 shown in FIG. 3) (S210) and one or more corresponding long-lived-configuration nodes (e.g., 340 shown in FIG. 3) (S231); using at least one snapchain-configuration node (e.g., 330) to generate one or more snapshots of the shapchain configuration node's chain state; and using one of the generated snapshots to synchronize the chain-state of at least one of the long-lived-configuration nodes (e.g., 340). In some implementations, the nodes (e.g., 330, 340) created by the parent node (e.g., 320 shown in FIG. 3) have a similar configuration (e.g., same implementation, network, version, and specialization). In some implementations, the parent node tags each snapshot with tag information generated by using configuration of the snapchain-configuration node (e.g., 330) that generated the snapshot. In some embodiments, S210 includes maintaining a snapchain-configuration node for each variation of long-lived-configuration nodes. In some embodiments, in response to updating configuration for a long-lived-configuration node (with updated configuration), a new snapchain-configuration node (with the updated configuration) is created. In some embodiments, in response to updating configuration for a long-lived-configuration node (with updated configuration), the configuration of at least one associated snapchain-configuration node is updated (with the updated configuration). In this manner, chain-state snapshots can be generated by using nodes that match the configuration of long-lived-configuration nodes that are being used to process blockchain network requests.

In some embodiments, in response to updating of configuration of a snapchain-configuration node, the tag information for snapshots generated by the snapchain-configuration node is also updated.

In some embodiments, at least one component of the system 100 performs at least a portion of the method 200. In some embodiments, a host (e.g., 130) performs at least a portion of the method 200. In some embodiments, a node (e.g., 135 shown in FIG. 1) performs at least a portion of the method 200. In some embodiments, a parent node (e.g., 135 shown in FIG. 1, 320 shown in FIG. 3) performs at least a portion of the method 200. In some embodiments, a child node (e.g., 330 shown in FIG. 3) performs at least a portion of the method 200. In some embodiments, an EC2 instance (e.g., 310 shown in FIG. 3) performs at least a portion of the method 200.

In some embodiments, the method functions to facilitate the "snapshotting" of a blockchain's chain state to sync new nodes.

In some implementations, snapshotting is performed by a remote datastore (e.g., 140, 360) (e.g., Amazon Elastic Block Store (EBS)) that is communicatively coupled to the blockchain platform 120. In some implementations, the datastore is implemented by one or more hardware servers. In some implementations, nodes of the blockchain platform store chain-state in datastore volumes managed by the datastore, and a component of the blockchain platform 120 (e.g., a parent node, a child node, etc.) controls the datastore to generate a snapshot by sending a request to the datastore via an API of the datastore (e.g., a Create_Snapshot( ) request). In some implementations, a component of the blockchain platform 120 (e.g., a parent node, a child node, etc.) tags the snapshot with tag information by including the tag information in the API request (e.g., a Create_Snapshot( ) used to control the datastore to generate the snapshot.

In some embodiments, "Snapshotting" includes syncing backup data from disk storage, or a datastore 140, by taking point-in-time "snapshots", or incremental backups. In some embodiments, "Incremental backups" involve syncing data such that only blocks that have changes after the most recent snapshot are saved (e.g., only the deltas are synced). This is in contrast to fully syncing, which involves syncing all data to a datastore from the beginning of all operational time. Snapshotting minimizes the time required to sync from backup data, and potentially saves on storage costs by not duplicating data. In some embodiments, incremental backup involves syncing a blockchain's chain state to a datastore 140 such that only blocks that have changes after the most recent snapshot are saved, whereas fully syncing involves syncing the full chain state of a blockchain to a datastore 140. In some embodiments, when deleting a snapshot, only the data unique to that snapshot is removed, not the full chain state data. Each snapshot contains all of the information needed to restore data from the moment when the snapshot is taken to a new datastore volume.

In a first example of snapshot creation, a new node, e.g., a new, unsynced virtual compute instance, is started within a host (e.g., virtual server). In some implementations, a parent node of the host starts the new node, and the new node is a child of the parent node. In some implementations, the node fully syncs the blockchain's chain state from other nodes in the network that are fully synced, which can take several days or a month. In some implementations, once the node is fully synced, the system captures an initial "snapshot" of the node's chain state (e.g., by sending a Create_Snapshot( ) request to the datastore 140). In some implementations, capturing the snapshot includes mounting a new datastore volume (snapshotting volume) to the node and generating a snapshot of the chain state of the node to the snapshotting volume. In some implementations, the node stores its chain state in a node storage location. In some implementations, the node storage location (that includes the node's chain state) is included in a storage device included in a host that runs the node (e.g., 130, 310). In some implementations, the node storage location is included in a datastore (e.g., 140, 360) that is remote, with respect to the node, and generating the snapshot includes sending an API request to the datastore to generate a snapshot of the node storage location and store the snapshot at a snapshot storage location managed by the datastore. In some implementations, the first snapshot generated by the datastore for the node storage location (included in the datastore) is a full backup, and subsequent snapshots generated by the datastore for the node storage location are incremental backups. In some implementations, generating the snapshot includes generating a snapshot by snapshotting the chain state stored in the node storage location, and storing the snapshot in a snapshot storage location. In some implementations, the snapshot storage location is included in a datastore (e.g., 140, 360) that is remote, with respect to the node.

In some implementations, generating the snapshot includes flushing the node storage location (for the node's chain state) to a separate data volume, and snapshotting the separate data volume. In some implementations, the separate data volume is included in a storage device included in the host that runs the node. In some implementations, the separate data volume is included in a storage device included in the remote datastore (e.g., 140).

In some implementations, the initial snapshot is a full copy of the chain state of the blockchain. In some implementations, after generation of the initial snapshot, a second node is created. In some implementations, the parent that creates the new node also creates the second node. In some implementations, the second node is a child instance of the parent node. In some implementations, the new node creates the second node. In some implementations, the second node is a child instance of the new node.

In some implementations, the second node is a new, unsynced virtual compute instance that is an identical copy of the node that created the second node, aside from a different process identifier. In some implementations, rather than fully syncing the second node's chain state from the beginning of the blockchain, a datastore volume (containing a snapshot of the blockchain's chain state) is mounted to the second node in a location where the second node is able to locate it. Since the second node is a clone of its parent node, it will operate with the mounted data volume such that the second node can immediately locate the chain state data. In comparison to the full manual sync, loading the chain state data from the mounted data volume only takes a few minutes.

In some embodiments, the datastore volume mounted to the second node functions as the second node's node storage location for the node's chain state. In some implementations, when the second node synchs with the blockchain network (e.g., no), the second node stores new blocks in the mounted data store volume.

In some embodiments, the second node's node storage location (which stores the node's the chain state) includes a link to the mounted datastore volume. In some implementations, when the second node synchs with the blockchain network (e.g., no), the second node stores new blocks in the second node's node storage location.

In some embodiments, the second node generates a second snapshot in a new snapshot volume that stores the incremental changes and references the unchanged blocks. In some implementations, generating the second snapshot includes snapshotting the second node's node storage location. In some embodiments, once the second snapshot is taken, it is categorized and individually versioned, which allows for safe node software upgrades and fallbacks to previous versions. In some embodiments, once the second snapshot has been generated, the second node is brought back up and synched to include blocks that have been added to the chain state while the second node was generating the second snapshot. Another snapshot can be generated for the up-to-date second node. This updating and snapshotting can then loop arbitrarily for the second node, with snapshots being taken on a regular or semi-regular basis to keep up-to-date, recent snapshots of the blockchain's chain state.

In a second example of snapshot creation (example shown in FIGS. 5A-5C), the method includes: syncing a new node with the blockchain and storing the synced chain in a data volume (e.g., a snapshotting volume) mounted to the node; turning off the node (e.g., upon satisfaction of a set of health checks for the blockchain; upon satisfaction of a set of snapshotting conditions, such as a time period being met); snapshotting the data volume; turning the node back on and syncing the missing blocks (e.g., storing the missing blocks to the data volume); and repeating the process to generate a time series of snapshots. Alternatively or additionally, instead of selectively turning the node (main node) on and off for snapshotting, the method can include synching one or more children nodes to the main node, and selectively turning the children nodes on and off for snapshotting purposes. The children nodes can be selectively turned on and off at different times to capture a more complete picture of the chain, or be toggled between the on and off states in synchrony. When children nodes are used, the children nodes preferably each write to (e.g., sync to) a different, distinct datastore volume, but can alternatively or additionally write to (e.g., sync to) the same datastore volume.

In a first example of snapshot use, while the snapshotting process of the previous examples semi-regularly generates snapshots, the system wishes to start up and sync a new node. Rather than fully syncing a node from the beginning, the parent node from the previous example sends a signal to terminate the first child node that has been generating snapshots. Upon receiving the signal, the first child node generates an incremental snapshot, then terminates. A second child node is spawned by the parent node, and syncs by storing any changed blocks and referencing the incremental snapshot. The child node is thus fully deployed within minutes rather than days, weeks, or months, resulting in a major improvement in speed and efficiency.

In a second example of snapshot use, the method includes, upon receipt of a node startup request: starting up a new node in an off state (e.g., within a host, with an API, etc.); selecting a snapshot; converting (e.g., on the fly) the snapshot into a data volume (e.g., with the full chain synched as of the snapshot time); mounting the data volume to the host (e.g., to the second child node), and turning on the second child node after mounting the data volume to the host.

S210 functions to generate a node in a snapchain configuration (snapchain-configuration node).

In some embodiments, S210 is performed in connection with generation of a node in a long-lived configuration. In some embodiments, a snapchain-configuration node is generated when a long-lived node having a new configuration is to be deployed. For example, if a new long-lived-configuration node is to be deployed having any one of a new implementation, network, version or specialization (relative to currently deployed long-lived-configuration nodes), then a new snapchain-configuration node is generated, having the same implementation, network, version and specialization as the long-lived-configuration node. In this manner, the snapchain-configuration node can be used to generate snapshots that match the configuration of the corresponding long-lived-configuration node, and new long-lived-configuration nodes can be deployed by using the generated snapshots. In some embodiments, in a case where a snapchain-configuration node does not match the configuration of any long-lived-configuration nodes, the snapchain-configuration node is removed (e.g., shut down, deleted, released, etc.).

In some embodiments, S210 includes configuring the generated node by using configuration information (e.g., command-line arguments, a configuration file, etc.). In some embodiments, the configuration information identifies at least one of: node implementation, network, version, and specialization. For example, configuration can include: "implementation: parity" (e.g., a parody node, which is an implementation of the ETH Blockchain); "network: ropsten" (e.g., a test network); "version: version 2.0.6 of the blockchain network"; and "specialization: default specialization".

In some embodiments, S210 includes generating the tag information for the snapchain-configuration node generated at S210. In some embodiments, the configuration information for the snapchain-configuration node is used to generate the tag information. In some embodiments, S210 includes storing the tag information. In some embodiments, a host generates the snapchain-configuration node, configures the node, and generates the tag information. In some embodiments, a parent node generates the snapchain-configuration node, configures the node, and generates the tag information. In some embodiments, S210 includes creating a parent node (S211), and using the parent node to generate the snapchain-configuration node (S212), configure the snapchain-configuration node, and generate the tag information for the snapchain-configuration node.

In some embodiments, at S211, the system creates a new parent node. In some embodiments, the parent node is a node in a blockchain associated with the cryptocurrency protocol. In a preferred embodiment, the system creates a new block storage instance, (e.g., EC2 instance), with containers for a blockchain node implemented with node software (e.g., bitcoind, Geth, or any other suitable node software), an Application Program Interface (API) container, a controller container, or any other suitable implementation. The system creates a datastore volume (e.g., EBS volume) on the fly and attaches it to this instance. In some embodiments, the system creates a file system on the datastore volume. In some embodiments, the system loads up a configuration file for the parent node that instructs the parent node on the snapchain process.

In some embodiments, the configuration of the parent node is set up for a pipelining process. Pipelining refers to setting up one or more executable steps to occur within a pipeline of instructions. In some embodiments, the system configures the parent node to set up an arbitrary number of executable steps to occur. In one example, while a snapshot is being generated, a pipeline is configured to first build an index of data around that snapshot, then upload the index. The index of data can then be queried.

In some embodiments, two or more modes can be configured to operate for the snapchain process, including a "snapchain configuration" and a "long-lived" configuration. In some embodiments, a snapchain configuration takes individually versioned snapshots of the chain state according to, e.g., steps S210 through S220 (creating a new parent node up through generating a snapshot). Snapchain nodes can be configured to run and produce snapshots in a loop indefinitely or until some termination event, such as the parent node being terminated. In a long-lived configuration, once one or more snapshots are produced, long-lived nodes can be employed to select and use these snapshots to start themselves up. There can be an arbitrarily many long-lived nodes to use these snapshots. For example, using six long-lived nodes in an implementation is possible, e.g., with four long-lived nodes for a production setup and two long-lived nodes for a staging setup. "Arbitrarily many", in this instance, refers to scaling out and handling or processing more node requests per second in an arbitrary amount, and dividing those requests across a larger number of requests per node using the load balancer. Long-lived configurations are configured according to, e.g., steps S231 to S232 (spawning a second child node and syncing the second child node using a snapshot).

In some embodiments, there are standard configurations that work globally, as well as custom configurations for specific node types. Configuration files can manifest in the form of .cfg files or other configuration formats or command line arguments. In a preferred embodiment, a snap node parent (e.g., 320) stores the configuration files per user. In a preferred embodiment, configuration files are updatable and dynamically configurable.

In some embodiments, at S212, the system spawns a first child node (e.g., 330) from the parent node (e.g., 320). In some embodiments, the first child node is in the snapchain configuration.

In some embodiments, the first child node writes to the datastore volume (e.g., a volume managed by the datastore 360). In a preferred embodiment, the first child node is spawned during processing of a fork( ) call. In some embodiments, a "fork-exec" system call is performed whereby a running process can spawn a child process. A child process is a clone of the parent process that spawns it. The child process receives a different value in a pipe variable that allows the parent process to identify that the process is a child process of that parent process, via a process identifier (PID).

In some embodiments, the child node is an exact copy of the parent node except for the return value of the fork( ) call, which returns the child's PID to the parent while it returns zero to the child, in order to allow the two identical processes to distinguish one another. Parent processes can keep track of all child processes through the process identifier. If a child process dies or otherwise terminates, a parent process can receive a signal that it occurred, so that the parent process can run one or more follow-up or contingency functions. A parent process can also send signals to the child process by a process identifier. In some embodiments, the purpose of a child process is to act as a container that the snapchain operates in, whereby the parent process can direct the child process to take a snapshot. This allows control over what the node process does, including shutting the node down to take snapshots. In some embodiments, the system can arbitrarily start and stop nodes at will in any volume desired.

In some embodiments, at S213, the system syncs the first child node (e.g., 330) such that the first child node is substantially identical to the parent node (e.g., 320), and includes an identifier which associates the first child node with the parent node. The system starts the new node binary, which allows the first child node to reach out to other nodes on the network to pair with. The other nodes have fully synced copies of their particular blockchain on them, e.g., they maintain a full copy of the blockchain on the disk. They will start sending blocks to the first child node for a full sync, which can be distributed, peer-to-peer, or via other suitable forms. The system sends a block, and the new node validates it. The system sends further blocks, and a new node validates them. This can continue until the first child node is fully synced.

In some embodiments, at S214, the system performs one or more health checks. The health checks are preferably defined per chain, but can alternatively be generic or shared across chains. In variants, the sync signal can be sent in response to determination that the child node (or parent node) is healthy (e.g., satisfies the health conditions). In a preferred embodiment, the system performs health checks on the child node (e.g., 330). In some embodiments, health checks can be performed on the parent node and/or blockchain. In some embodiments, the system performs health checks on the storage volumes.

In some embodiments, at S215, the system receives a sync signal from the first child node (e.g., 330) that the first child node is fully synced. In a preferred embodiment, the system calls a blockchain network function or receives a ping from a node. Alternatively, the system can compare headers to blocks, and when they match or substantially match, the node is fully synced. Alternatively, the system can check the age of the last known block. If the block's age is past a certain expired time (e.g., 90 minutes), the system determines that the block is out of sync.

In some embodiments, S220 functions to generate a snapshot. In embodiments, S220 includes using a snapchain-configuration node (e.g., generated at S210) to generate the snapshot. In some embodiments, a parent node (e.g., generated at S211) controls the snapchain-configuration node to generate the snapshot. In some embodiments, a parent node (e.g., generated at S211) controls a datastore (e.g., 140) that stores the chain-state of the snapchain-configuration node (e.g., in datastore volume 145 shown in FIG. 1) to generate the snapshot (e.g., 147 shown in FIG. 1). In some embodiments, the parent node controls the datastore to generate the snapshot by providing the datastore with a Create_Snapshot( ) API request. In some implementations, the Create_Snapshot( ) API request identifies the datastore volume (e.g., 145) that includes the chain state of the snapchain-configuration node. In some implementations, the Create_Snapshot( ) API request identifies tag information to be stored in association with the generates snapshot.

In some embodiments, S220 includes generating the tag information for the snapshot. In some embodiments, the parent node (e.g., generated at S210) generates the tag information. In some embodiments, the tag information is generated based on configuration information for the snapchain-configuration node. In some variations, the parent node accesses the configuration information for the snapchain-configuration node and uses the accessed configuration information to generate the tag information for the snapshot. In some embodiments, the tag information includes at least four different tags. In some embodiments, the tag information includes information identifying at least one of the following attributes of the node: implementation, network, version and specialization. For example, the tag information can include: "implementation: parity" (e.g., a parody node, which is an implementation of the ETH Blockchain); "network: ropsten" (e.g., a test network); "version: version 2.0.6 of the blockchain network"; and "specialization: default specialization".

In some embodiments, S220 includes storing the snapshot in association with the tag information. In some variations, the parent node stores the snapshot and the associated tag information at a datastore (e.g., 140, 360). In some embodiments, the datastore (e.g., 140) stores the snapshot in association with the tag information in response to processing a Create_Snapshot( ) API request identifies the tag information.

In some embodiments, at S221, the system can send a termination signal to the first child node (e.g., 330). This termination signal can function to turn the first child node off (e.g., halt first child node syncing). In some embodiments, where a sync signal is received from the first child node, the system sends the termination signal in response to the sync signal. The termination signal can be a pipeline call, instruction, command, or any other suitable form of signal. In some embodiments, the termination signal is sent from the parent node (e.g., 320) to the first child node (e.g., 330).

In some embodiments, at S222, the system receives a signal from the child node (e.g., 330) that termination of the child node is completed.

In some embodiments, at S223, the system generates a snapshot of the first child node's chain state. In some embodiments, generating the snapshot includes snapshotting the data stored in the first child node's node storage location (which includes the node's chain state). In some implementations, the node storage location only includes the first child node's chain state. In some implementations, the node storage location includes a full copy of the chain state, and the snapshot is a full backup of the chain state. In some implementations, the node storage location includes portions of the chain state stored after a previous snapshot, as well as a link to the previous snapshot, and the snapshot is an incremental backup of the chain state.

In some embodiments, the snapshot is a point-in-time snapshot of the datastore volume (e.g., 145) (e.g., an EBS volume snapshot). In some embodiments, the snapshot is an incremental backup, meaning rather than including all blocks included in the related blockchain, the incremental backup only includes blocks that have been added to the blockchain after the most recent snapshot has been generated. In some embodiments, use of incremental backups minimizes the time required to create the snapshot, and saves on storage costs by not duplicating data. In some embodiments, each snapshot contains all of the information needed to restore the node data from the moment when the snapshot is taken to a new volume (e.g., EBS instance, other storage instance). In one implementation, the method includes: flushing the data from the first child node to disc, and taking a snapshot (or backup) of the first child node. In some embodiments, the system writes all tagged data such as AWS tag data. In some embodiments, the system tags each snapshot with tag information. In some embodiments, the tag information identifies a configuration of the first child node.

In some embodiments, S230 functions to synch a node using a snapshot (e.g., generated at S220). In some embodiments, the node being synched is a node in a snapchain configuration, wherein the node is used to generate additional snapshots. In some embodiments, the node being synched is a node in a long-lived configuration, wherein the node is used to process requests for the associated blockchain network.

In some embodiments, the node synchronized at S230 has a same implementation as the node generated at S210. In some embodiments, the node synchronized at S230 has a same network as the node generated at S210. In some embodiments, the node synchronized at S230 has a same specialization as the node generated at S210.

In some embodiments, the node synchronized at S230 has a same semantic configuration as the node generated at S210. In some embodiments, the node synchronized at S230 has a same semantic version as the node generated at S210.

In some embodiments, S230 includes selection of the snapshot (e.g., stored at the datastore 140, 360).

In some embodiments, the parent node (e.g., created at S211) controls synching of the node. In some implementations, the parent node synchs the node by selecting a snapshot, creating a new datastore volume (e.g., 145) based on the selected snapshot, and mounting the new datastore volume to the node.

In some embodiments, the parent node selects the snapshot. In some embodiments, a snapshot whose tag information matches at least one attribute of the configuration of the node is selected.

In some embodiments, the snapshot tag information identifies an implementation, network, specialization, version, and time stamp associated with the snapshot, and the configuration of the node to be synched identifies an implementation, network, specialization, and version. However, the snapshot tag information can include any other suitable metadata or information associated with the snapshot (e.g., with the snapshot process, snapshot content, etc.).

In some embodiments, selecting the snapshot includes selecting a most recent snapshot whose tag information matches an implementation, network, specialization, and version of the configuration of the node being synched.

In some embodiments, selecting the snapshot includes selecting a most recent snapshot whose tag information matches an implementation, network, and specialization of the configuration of the node being synched.

In some embodiments, selecting the snapshot includes selecting a most recent snapshot whose tag information matches an implementation, network, and specialization of the configuration of the node being synched, and whose version matches a specified version. In some variations, the specified version is automatically identified by a management process (e.g., a node fallback process). In some variations, the specified version is automatically identified by user input received via at least one of an API and a user interface provided by the blockchain platform. However, the specified version can be otherwise identified.

In some implementations, the parent node selects the snapshot by receiving tag information (and snapshot identifiers) for available snapshots, and selecting a snapshot based on the tag information. In some implementations, the parent node sends a Describe_Snapshots( ) API request to the datastore (e.g., 140), and the datastore processes the Describe_Snapshots( ) request by returning information identifying all available snapshots. In some implementations, the datastore's response to the Describe_Snapshots( ) request includes the tag information for each identified snapshot.

In some implementations, the parent node selects the snapshot by querying the datastore for available snapshots whose tag information matches selection criteria. In some implementations, the Describe_Snapshots( ) request identifies selection parameters for selecting a snapshot based on tag information. In some implementations, the datastore processes the Describe_Snapshots( ) request by identifying snapshots that match the selection parameters identified by the Describe_Snapshots( ) request, and returning information identifying all matching snapshots.

In some implementations, the parent node creates a new datastore volume by sending a Create_Volume( ) API request to the datastore (e.g., 140). In some implementations, the Create_Volume( ) API request identifies the selected snapshot; the datastore processes the Create_Volume( ) request by creating a new datastore volume from the snapshot identified by the Create_Volume( ) request, and returning information identifying the created volume to the parent node.

In some implementations, the parent node mounts the new datastore volume to the node by sending an Attach_Volume( ) request to the datastore. In some implementations, the Attach_Volume( ) request identifies the new datastore volume and the virtual server instance of the node; the datastore processes the Attach_Volume( ) request by attaching the identified datastore to the virtual server instance.

In some embodiments, at S231, the system spawns a second child node from the parent node, wherein the second child node writes to the datastore. The second child node can be used as: a snapshot node (e.g., wherein S213 through S223 can be repeated using the second child node in lieu of the first child node); used as a long-lived node (e.g., nodes used for deployment); or otherwise used. In some embodiments, spawning the second child node is identical to the process for spawning the first child node, and preferably occurs via a fork-exec call.

In some embodiments, at S232, the system syncs the second child node using the generated snapshot. In some embodiments, S232 preferably includes: selecting a snapshot from the set of recorded snapshots; and creating the second child node based on the selected snapshot. Snapshot selection can be performed using one or more selection strategies. In some embodiments, a "most recent" strategy is used as a strategy. This includes choosing a snapshot to restore from with the most recent timestamp attached. In one example, a snapshot that is completed at 2:00 PM is chosen over a snapshot that was completed at 1:00 PM. In some embodiments, a "closest previous version" strategy is employed. This includes choosing a snapshot to restore from that is the closest previous semantically versioned snapshot, e.g., for fallback. Semantic versioning allows for versions to be compared such that there can be "greater than" or "less than" comparisons between versions. For example, 0.18.2 is semantically less than 0.19.0. This provides for using the snapshot from a previous version rather than starting and fully syncing a new node.

Creating the second child node based on the selected snapshot can include: creating the second child node in an off state (e.g., within a host, such as an EC2 instance; with an API container, etc.), converting (e.g., on the fly) the snapshot into a datastore (e.g., with the chain synched as of the snapshot), mounting the datastore (e.g., data volume) to the host (e.g., to the second child node), and turning on the second child node after mounting the data volume to the host. When the selected snapshot is a recent snapshot, this can expedite node startup because the datastore mounted to the second child node already has a full copy of the blockchain (e.g., as of the snapshot time), so the second child node is already synched with the blockchain and/or has minimal blocks to sync after being turned on.

In variants of the method, the snapshot node can be toggled to an on or synching state, and S213 through S223 can be repeated (e.g., until a stop condition is met, forever, etc.) using the snapshot node. The snapshot node can be: the parent node, the first child node, a child node generated using S231 and S232 (e.g., the second child node); or any other suitable node.

EXAMPLES

In one example, the method can include: iteratively synchronizing blocks from peers of a blockchain network (e.g., chain-state) to a first blockchain node (snapchain node) and generating a snapshot of the blockchain network from the first blockchain node (snapchain node); mounting the snapshot to a second blockchain node (long-lived node); connecting the second blockchain node (long-lived node) to the blockchain network after mounting the snapshot; synchronizing blocks, generated after the snapshot, from peers of the blockchain to the second blockchain node (e.g., contemporaneously with block synchronization and/or snapshotting of the first blockchain node, asynchronously with block synchronization and/or snapshotting of the first blockchain node, etc.); and transmitting blockchain requests, received from a set of clients, from second blockchain node (long-lived node) to the blockchain network.

Generating the snapshot of the blockchain network can include: halting synchronization of the first blockchain node with the peers; and storing the snapshot of the first blockchain node including the synchronized blocks. The snapshot can be performed in response to the first blockchain node satisfying a set of health checks (e.g., specific to the blockchain network, implementation, specialization, version, and/or characteristic or sub-characteristic of the first blockchain node's blockchain configuration; example shown in FIG. 7), periodically, or at any other suitable time. Examples of health checks (e.g., health conditions) can include: heuristics; determining that the last synced block's age is less than a threshold age (e.g., wherein the threshold is probabilistically determined); determining that the blocks are synching at a predetermined frequency (e.g., determined based on the expected block generation rate for the blockchain network); determination that the network state determined from the node matches the network state determined by peers or third party block explorers; and/or other checks. One or more snapshots can be generated for each blockchain network, in series or in parallel. Snapshots for a blockchain network can be generated by a single snapchain node or a plurality of snapchain nodes. In a specific example, a first and second snapchain node alternate between synchronizing and snapshotting.

In this example, the mounted snapshot preferably selected from the series of snapshots. The selected snapshot can be: the most recent snapshot (e.g., to the long-lived nodes initialization time, the current time, etc.) for the long-lived node's desired configuration (e.g., blockchain network, specialization, implementation, version, etc.; determined by a management entity, a client, or otherwise determined); the last healthy snapshot (e.g., determined by comparing the snapshot data with peers or third-party block explorers, based on health data associated with the snapshot, etc.); or any other suitable snapshot.

Health checks (e.g., the same or different from those for the snapchain node) can be run on the long-lived nodes. In a specific example, in response to the long-lived node failing the health check (or in response to another request, such as a chain cut-over request, a rollback request, etc.), a new long-lived node(s) can be dynamically initialized, mounted to a snapshot, connected to the blockchain network (e.g., via a load balancer, directly connected), and service client requests, wherein the unhealthy long-lived node can be disconnected from the blockchain network (e.g., immediately; after new node connection with the blockchain; after new node synchronization with the blockchain; etc.). However, health check failures can be otherwise managed.

Figure 7:
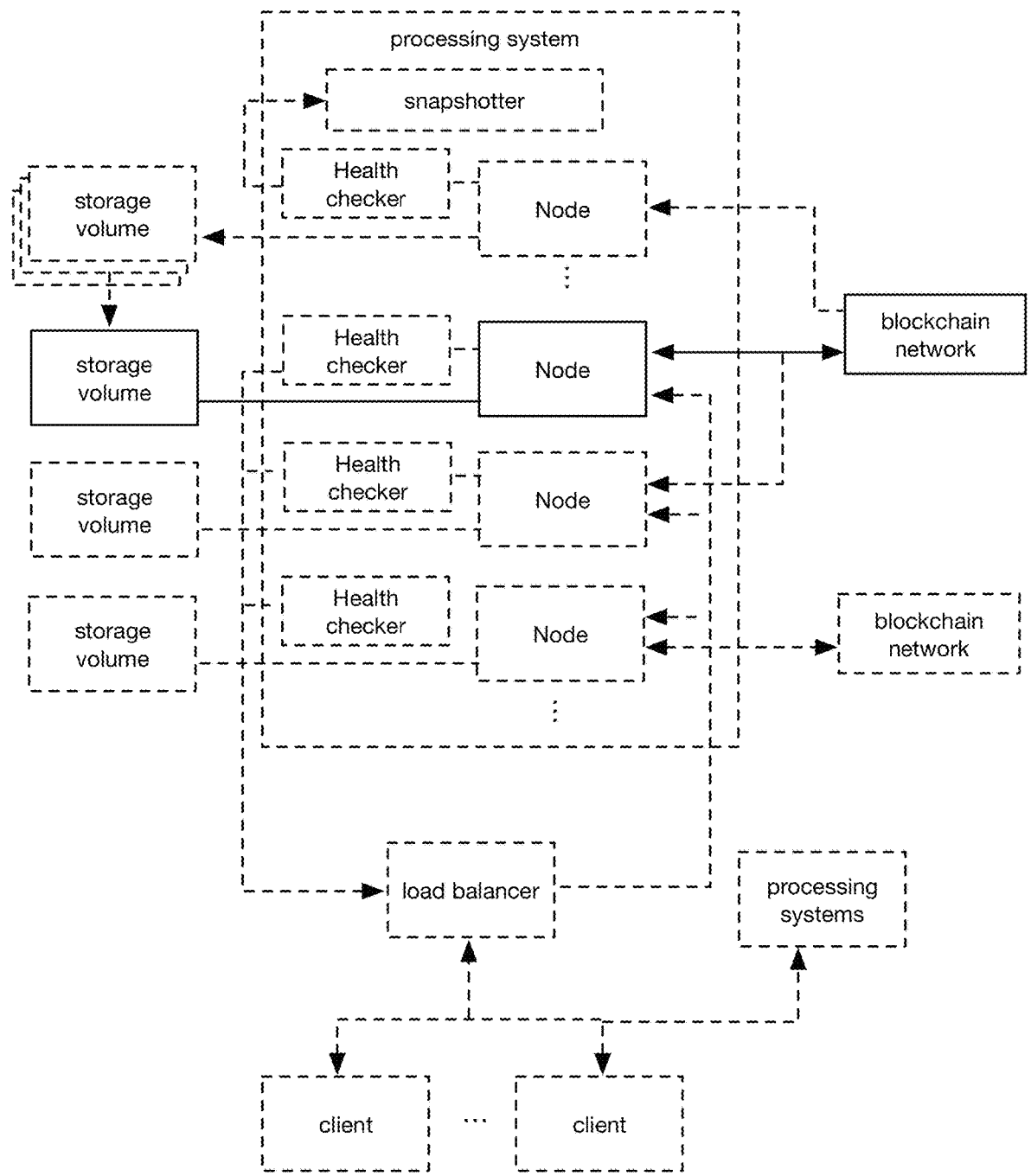
FIG. 7 is an example of the system.

This example can optionally include receiving the blockchain request(s) at a load balancer (e.g., network load balancer, elastic load balancer, etc.; example shown in FIG. 7), connected to long-lived node(s) (e.g., of a single blockchain network configuration, multiple blockchain network configurations, etc.), wherein the load balancer functions to route blockchain requests to different long-lived nodes for transmission to the respective blockchain network. The requests are preferably routed based on the respective long-lived node's health (e.g., determined by the long-lived node, by the processing system managing the long-lived node, etc.), but can route based on request-node configuration matches (e.g., matching blockchain network, specialization, implementation, version, etc.; wherein both the node and request are associated with a configuration), network traffic, volume, node performance, and/or otherwise route the requests.

In this example, the method can be performed for different blockchains, such as different blockchain protocols, implementations, specializations, and/or versions. Specific examples include: Bitcoin, Ethereum, Litecoin, Tezos, Cosmos, testnets of the above, and/or any other suitable blockchain network. In steady-state operation, multiple snapchain nodes (servicing snapshots) and multiple long-lived nodes (servicing requests) can be contemporaneously (e.g., concurrently, simultaneously) run.

The first blockchain node (snapchain node) is preferably isolated from direct client communication (e.g., snapchain nodes do not directly receive blockchain requests, such as signed messages, from the clients), but can additionally or alternatively send data to, receive data (e.g., requests) from, or otherwise communicate with the clients.

In this example, the method can additionally include initializing nodes (e.g., long-lived nodes, snapchain nodes, etc.), which can include: initiating a processing system (e.g., a virtual server, a physical server, a hard drive, etc.); loading the node onto the processing system (e.g., the blockchain protocol, an image associated with the desired blockchain network configuration, a container, etc.); and loading a blockchain platform interface (e.g., a container, an image, etc.) onto the processing system. Each processing system preferably includes multiple nodes, but can additionally or alternatively include a single nodes. The health checks can be run on and/or implemented by the blockchain platform interface, or otherwise implemented.

In this example, initializing a node can optionally include mounting a storage volume (e.g., virtual storage, EC2 instance, nonvolatile memory, etc.) to the processing system. In a specific example when the node is a snapchain node, the storage volume can be empty, wherein the synced blocks (e.g., chain state) is flushed to the storage volume when generating the snapshot (e.g., after halting synchronization). The snapshot can be taken from the storage volume or the flushed data can constitute the snapshot. The same or a new storage volume can be mounted to the processing system for subsequent snapshot generation. In a specific example when the node is a long-lived node, mounting the snapshot preferably includes: turning a snapshot into a storage volume (e.g., on the fly), and mounting the storage volume to the processing system. One or more processing systems can be connected to the same storage volume; alternatively, a single processing system can be connected to a storage volume.

The system can be an ephemeral system (e.g., with no static IPs), a persistent system (e.g., with static IPs), and/or any other suitable system. For example, the nodes and/or clients can each have their own static IP address (e.g., wherein the IP addresses can be registered with the load balancer or another management system). The blockchain network is preferably an ephemeral system, but can additionally or alternatively be a persistent system.

Figure 3:
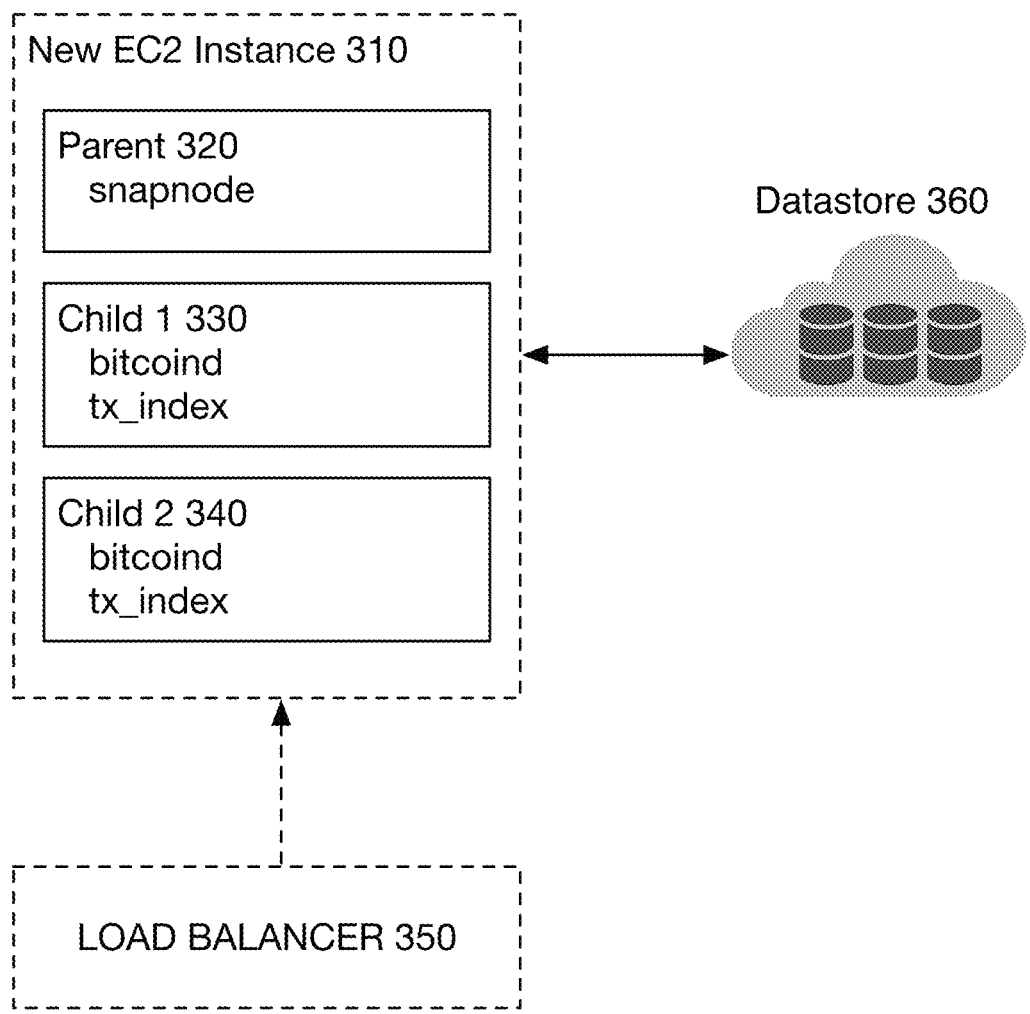
FIG. 3 is an illustration of an example of a system, in accordance with embodiments.

FIG. 3 is an illustration of an example of the node syncing system according to one of the embodiments. The example specifically illustrates a single virtual server running a snapchain configuration. A new virtual server instance is created in the form of new EC2 instance 305, and a new snapchain node, configured via a snapchain configuration file, is created as parent 320.

The parent fully syncs the chain state from one or more other fully synced nodes, then spawns a first child, Child 1 330, which is implemented via node software bitcoind and which is configured via a tx_index configuration file. Once Child 1 330 is fully synced, it generates a snapshot which is written to a datastore volume in datastore 1 360. The Child 1 330 continues to update blocks in the chain state and generate more snapshots which are written to the datastore volume in datastore 1 360.

The parent 320 then can spawn a second child node, Child 2 340, which syncs quickly by mounting the datastore volume in datastore 1 360 and syncing via the most recent snapshot stored therein, rather than fully syncing. The EC2 instance 310 operates behind a load balancer 350 which handles routing and processing between different virtual server instances.

Figure 4:
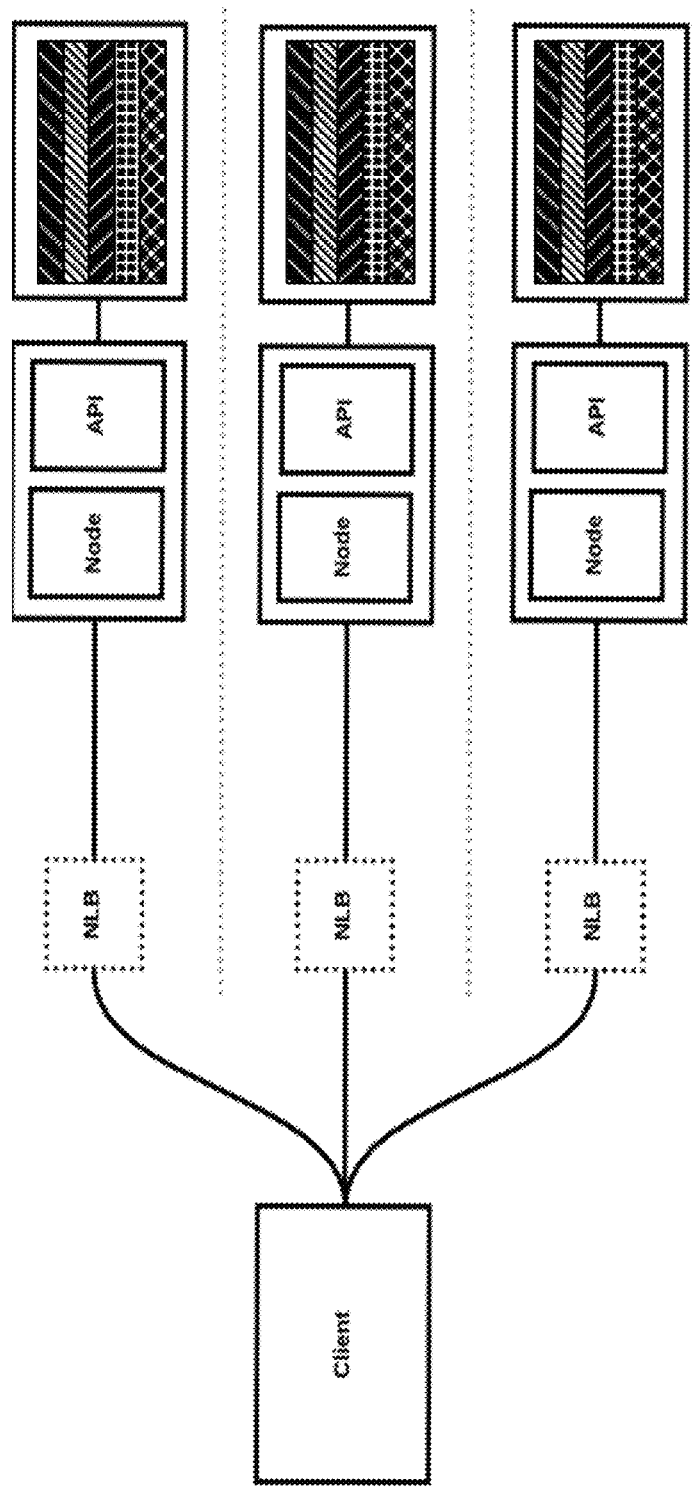
FIG. 4 is an illustration of an example a system, in accordance with embodiments.

FIG. 4 is an illustration of an example of the node syncing system according to one of the embodiments. In this example, a client is a blockchain platform that connects to multiple virtual server instances via a load balancer that operates as a network load balancer (NLB). Each of the virtual server instances contains one or more nodes and an API container. Each of the virtual server instances connects to a cloud-based datastore which acts as a storage or disk for the nodes in the virtual server instance. Using the NLB, a blue/green deploy can be performed between the multiple virtual server instances in order to upgrade to a new blockchain version, fallback to an old version in a previous snapshot, or perform other administrative or maintenance task with respect to the blockchain and/or blockchain nodes.

Figure 5A:
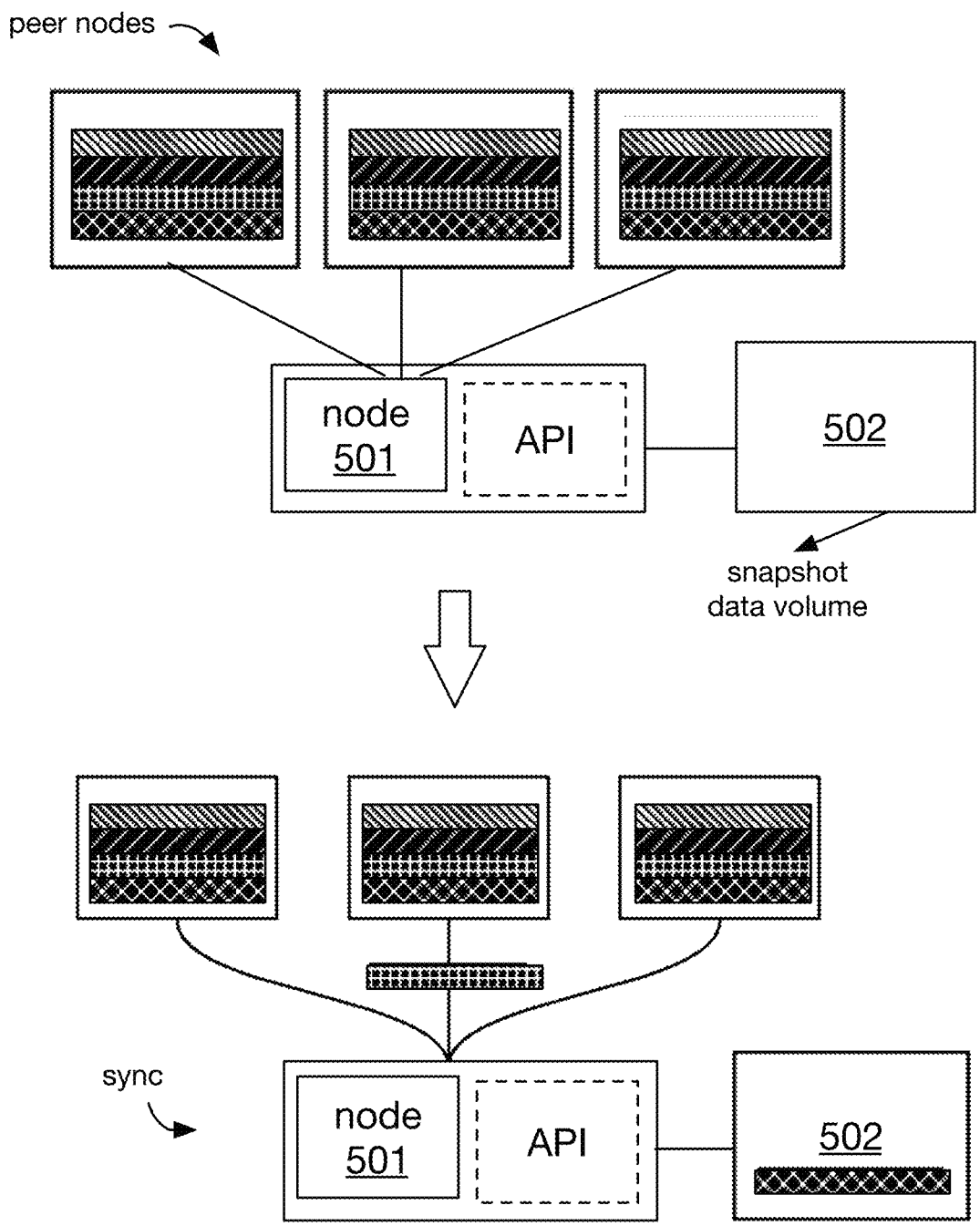
FIGS. 5A, 5B, and 5C are an illustration of synching, in accordance with embodiments.

FIG. 5A is an illustration of synching a new node to the blockchain. As shown in FIG. 5A, the data volume 502 is mounted to the node 501, and it stores the node's chain state. Initially, the data volume 502 does not store any chain state, but as the node synchs with peer nodes, synched chain state is stored at the data volume 502.

Figure 5B:
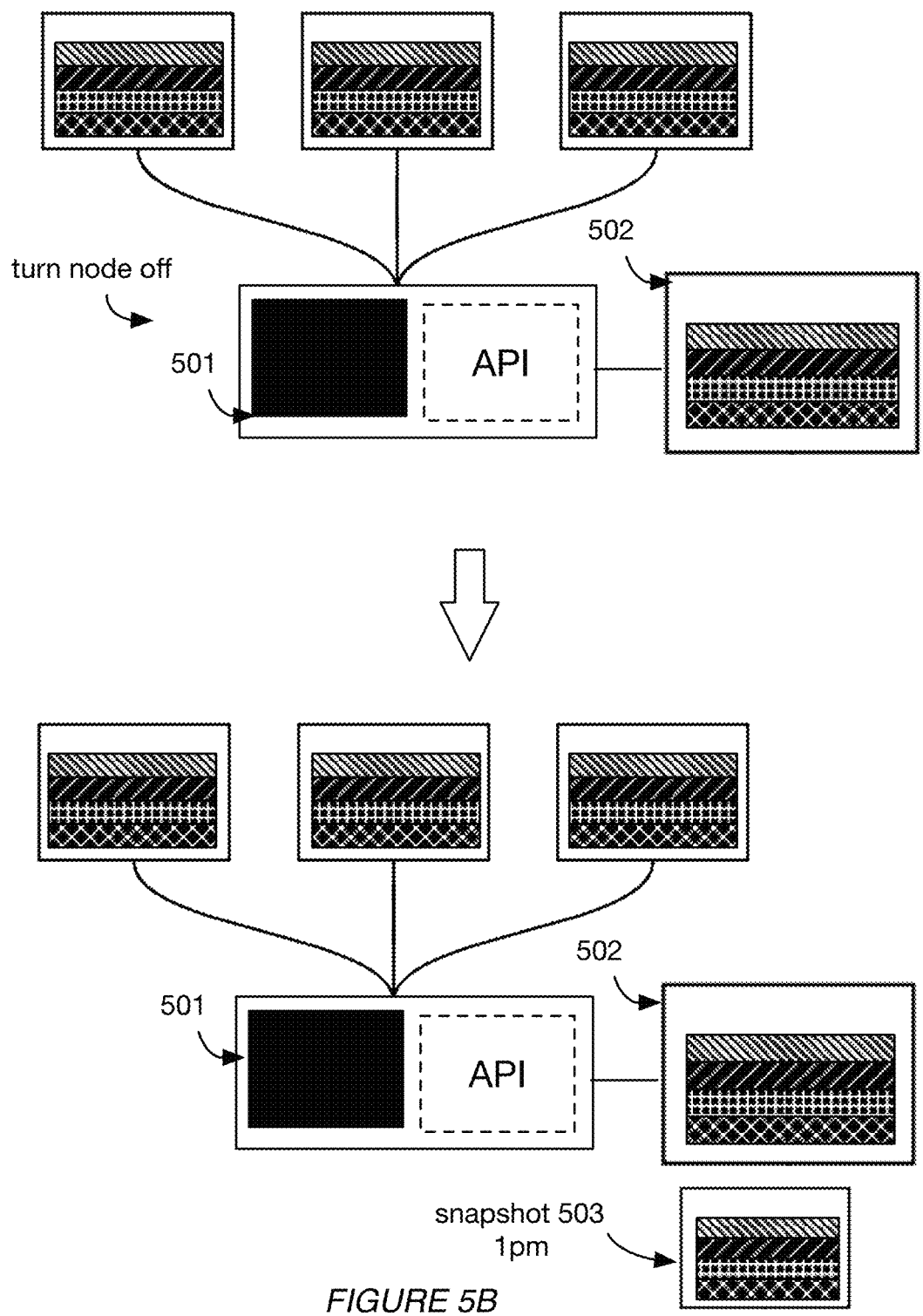

FIG. 5B is an illustration of halting node synching and taking a snapshot of the data volume storing the chain state for the new node. As shown in FIG. 5B, node 501 is halted (turned off), such that it is no longer updating its chain state based on information received from peer nodes. At 1 pm, a snapshot 503 is generated for the data volume 502.

Figure 5C:
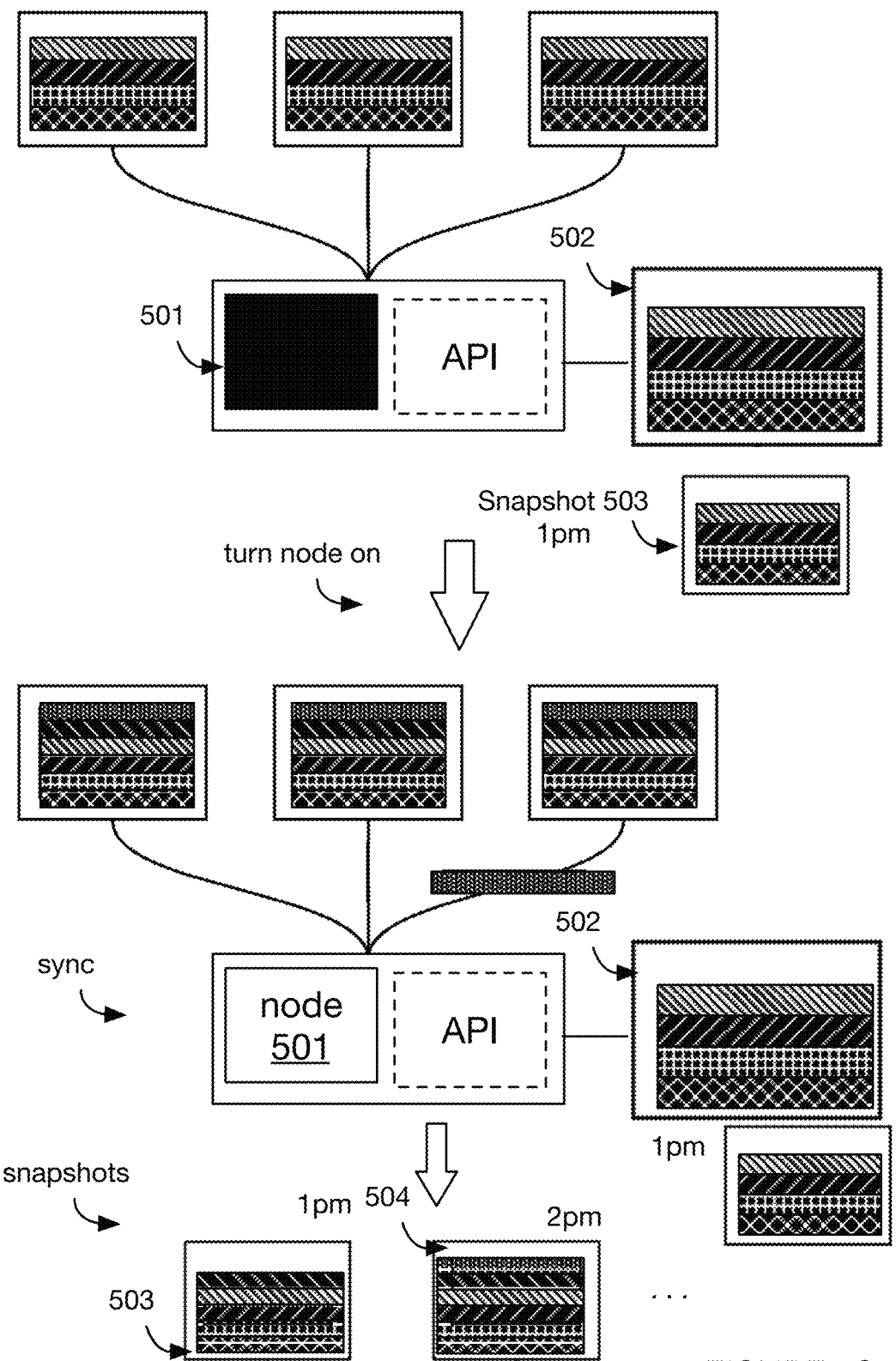

FIG. 5C is an illustration of resuming node syncing and repeating the snapshotting process to generate a set of snapshots for the blockchain. As shown in FIG. 5C, node 501 is turned back on, such that it resumes updating chain state (stored at the data volume 502) based on information received from the peer nodes. The process is repeated to result in generation of a second snapshot 504.

Figure 6:
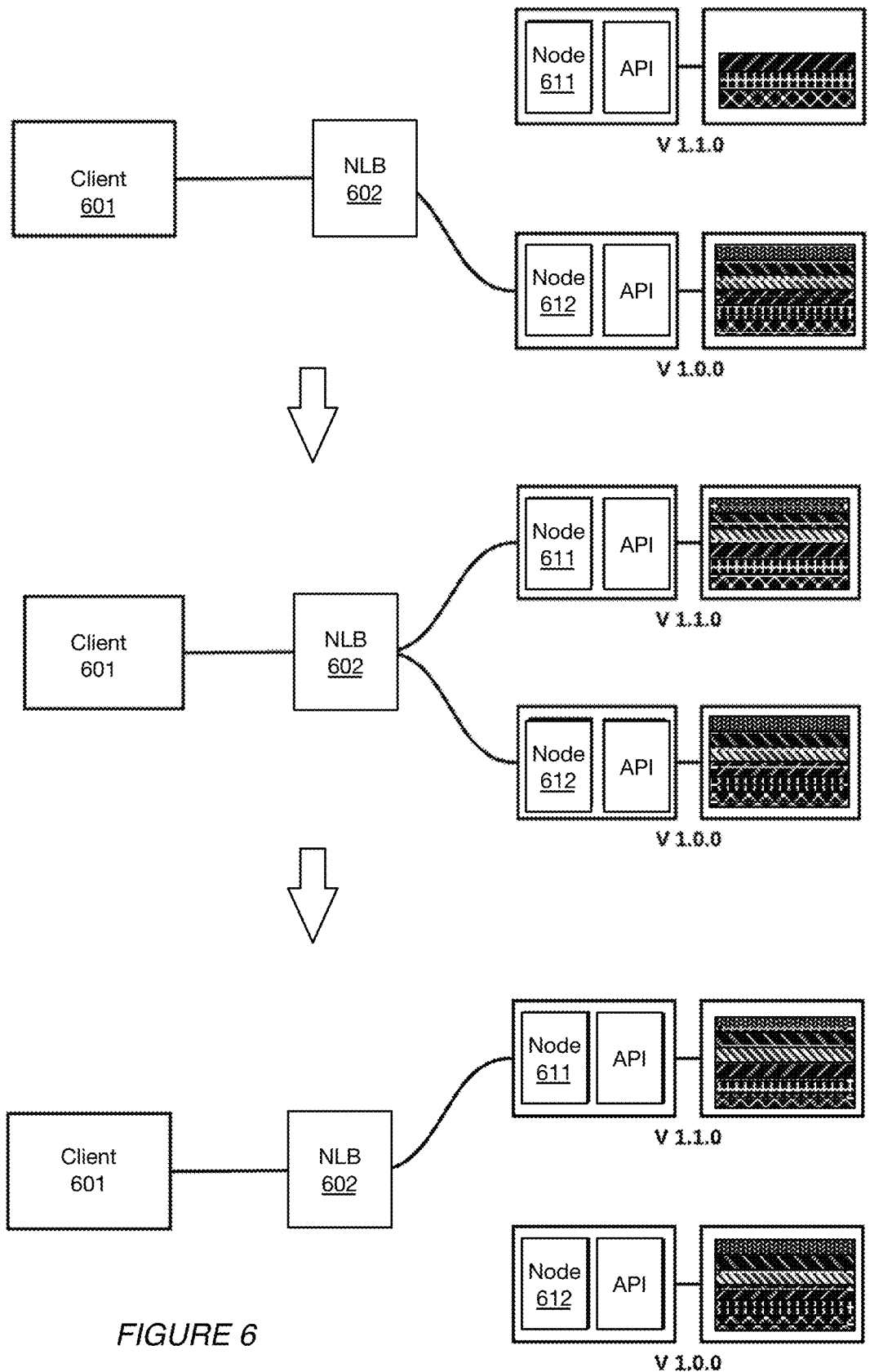
FIG. 6 is an illustration of an example of deployment, in accordance with embodiments.

FIG. 6 is an illustration of an example of deployment from one version of the blockchain to another. As shown in FIG. 6, a blockchain client 601 (e.g., a wallet application, etc.) is communicatively coupled to a network load balancer 602, which routes blockchain traffic to one or more blockchain nodes 611 and 612. As shown in FIG. 6, the node 611 (having a newer node version) is initially offline (meaning that it is not processing traffic from the client 601. The node 611 is initially synched by using a snapshot. After synching by using the snapshot, the node 611 is brought online, meaning that it can process traffic from the client. Thereafter, the node 612 (having an older node version) is brought offline.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising: with a blockchain platform:
spawning a snapchain node having a snapchain configuration;
generating first snapshot tag information for the snapchain node based on a configuration of the snapchain node; and
sending a signal to generate a first snapshot of a first chain-state of the snapchain node and store the first snapshot in association with the first snapshot tag information,
wherein sending the signal to generate the first snapshot of the first chain-state of the snapchain node and to store the first snapshot in association with the first snapshot tag information comprises: sending a snapshot request to a datastore storing the first chain state,
wherein the snapshot request identifies the first snapshot tag information.

2. The method of claim 1, further comprising, with the blockchain platform:
spawning a long-lived node having a long-lived configuration; and
synchronizing a second chain-state of the long-lived node by using the first snapshot.

3. The method of claim 2, further comprising:
with the long-lived node, processing requests for a blockchain network associated with the long-lived node.

4. The method of claim 3, further comprising: with the blockchain platform:
prior to sending the signal to generate the first snapshot, synchronizing the first chain-state of the snapchain node with the blockchain network.

5. The method of claim 3, further comprising: with the blockchain platform:
prior to sending the signal to generate the first snapshot, terminating the snapchain node.

6. The method of claim 5, wherein the blockchain platform terminates the snapchain node responsive to a synchronization complete signal for the snapchain node.

7. The method of claim 2, wherein synchronizing the second chain-state of the long-lived node by using the first snapshot comprises:
selecting the first snapshot from among a plurality of snapshots, based on a match between a configuration associated with the long-lived node and the first snapshot tag information of the first snapshot.

8. The method of claim 7, wherein the first snapshot tag information identifies an implementation, blockchain network, specialization, version, and time stamp associated with the first snapshot, and wherein the configuration of the long-lived node identifies an implementation, network, specialization, and version associated with the long-lived node.

9. The method of claim 8, wherein selecting the first snapshot from among a plurality of snapshots comprises selecting the first snapshot based on a match between an implementation, blockchain network, and specialization identified by the first snapshot tag information and an implementation, blockchain network, and specialization of the configuration of the long-lived node, wherein the first snapshot is the most recent snapshot whose implementation, network, and specialization match the configuration of the long-lived node.

10. The method of claim 1,
further comprising, with the blockchain platform: prior to sending the signal to generate the first snapshot, performing health checks on the snapchain node to determine whether the snapchain node satisfies health-check criteria,
wherein sending the signal to generate the first snapshot comprises: sending the signal responsive to a determination that the snapchain node satisfies the health-check criteria.

11. A method for rapid blockchain node deployment, comprising: with a blockchain platform:
periodically generating snapshots of a blockchain of a blockchain network by using a snapchain node that synchronizes with peer nodes of the blockchain network; and
mounting at least one snapshot to a long-lived node,
wherein for each snapshot, generating the snapshot comprises:
generating snapshot tag information for the snapchain node based on configuration of the snapchain node, and
sending a signal to generate the snapshot from chain-state of the snapchain node and store the snapshot in association with the snapshot tag information.

12. The method of claim 11, further comprising, with the blockchain platform:
connecting the long-lived node to the blockchain network after mounting the at least one snapshot to the long-lived node.

13. The method of claim 12,
further comprising, with the blockchain platform: after mounting the at least one snapshot to the long-lived node and connecting the long-lived node to the blockchain network, synchronizing blocks of the blockchain network from the peer nodes to the long-lived node,
wherein the blocks synchronized from the peer nodes are blocks that are generated after generation of the at least one snapshot mounted to the long-lived node.

14. The method of claim 13, further comprising, with the blockchain platform:
   transmitting blockchain requests, received from clients connected to the long-lived node, from the long-lived node to the blockchain network, wherein the snapchain node is isolated from direct client communication.

15. The method claim 14,
   wherein the long-lived node is associated with an implementation and is one of a plurality of long-lived nodes connected to a network load balancer,
   wherein each blockchain request is associated with a blockchain network and implementation, and
   wherein the network load balancer selects the long-lived node based on the blockchain network and implementation associated with the blockchain request.

16. The method of claim 11, further comprising, with the blockchain platform:
   performing a health check, specific to the blockchain network, on the snapchain node, wherein each snapshot is generated in response to satisfaction of the health check.

17. The method of claim 11, further comprising, with the blockchain platform:
   periodically generating snapshots of a second blockchain of a second blockchain network by using a second snapchain node that synchronizes with peer nodes of the second blockchain network; and
   mounting at least one snapshot to a second long-lived node for the second blockchain network,
   wherein for each snapshot generated for the second blockchain network, generating the snapshot comprises:
      generating snapshot tag information for the second snapchain node based on configuration of the second snapchain node, and
      sending a signal to generate the snapshot from chain-state of the second snapchain node and store the snapshot in association with the snapshot tag information.

18. The method of claim 17, wherein the blockchain network is Bitcoin, and
   wherein the second blockchain network is Ethereum.

19. The method of claim 11, further comprising, with the blockchain platform:
   periodically generating snapshots of the blockchain of the blockchain network by using a second snapchain node that synchronizes with peer nodes of the blockchain network.

20. A method comprising: with a blockchain platform:
   spawning a snapchain node having a snapchain configuration, wherein the snapchain node is a child of a parent node in a blockchain network;
   synchronizing the snapchain node to the parent node such that the snapchain node is a copy of the parent node except for a process identifier;
   generating first snapshot tag information for the snapchain node based on a configuration of the snapchain node; and
   sending a signal to generate a first snapshot of first chain-state of the snapchain node and store the first snapshot in association with the first snapshot tag information.

* * * * *